June 11, 1929.    H. B. MARSHALL    1,717,051
GASOLINE GAUGE
Filed May 18, 1925    2 Sheets-Sheet 2
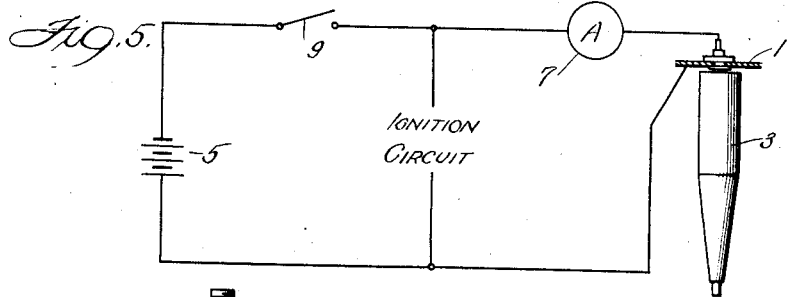
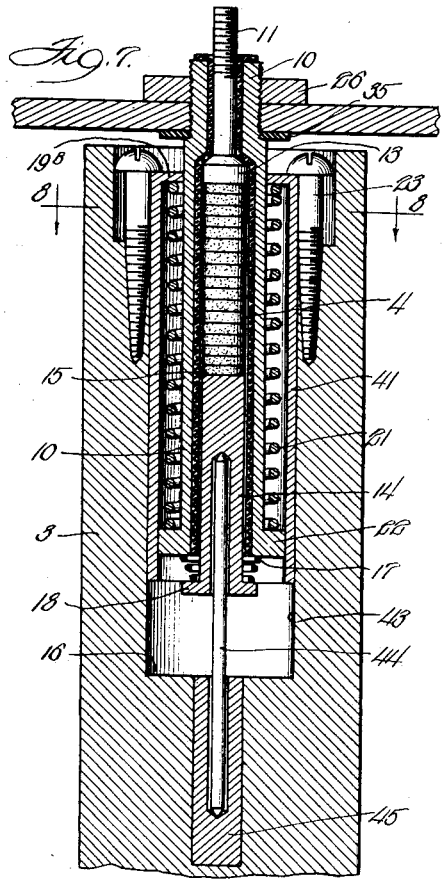
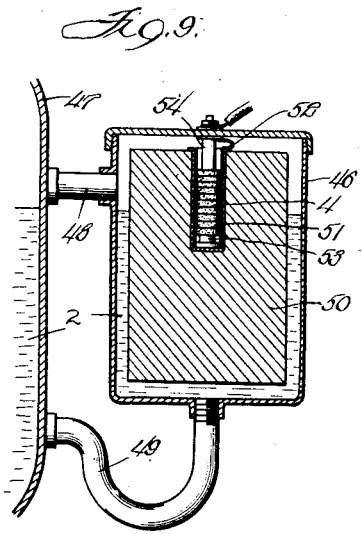
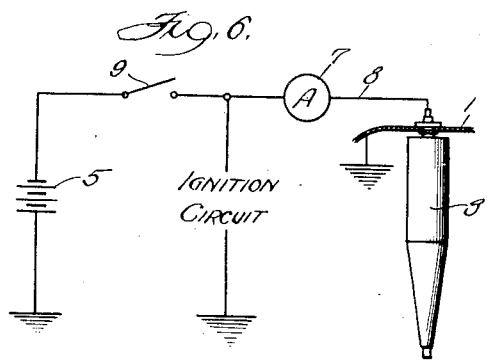
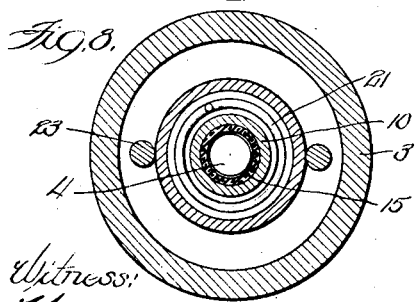
Inventor:
Harry B. Marshall
by Albert Scheible
Attorney Patented June 11, 1929.

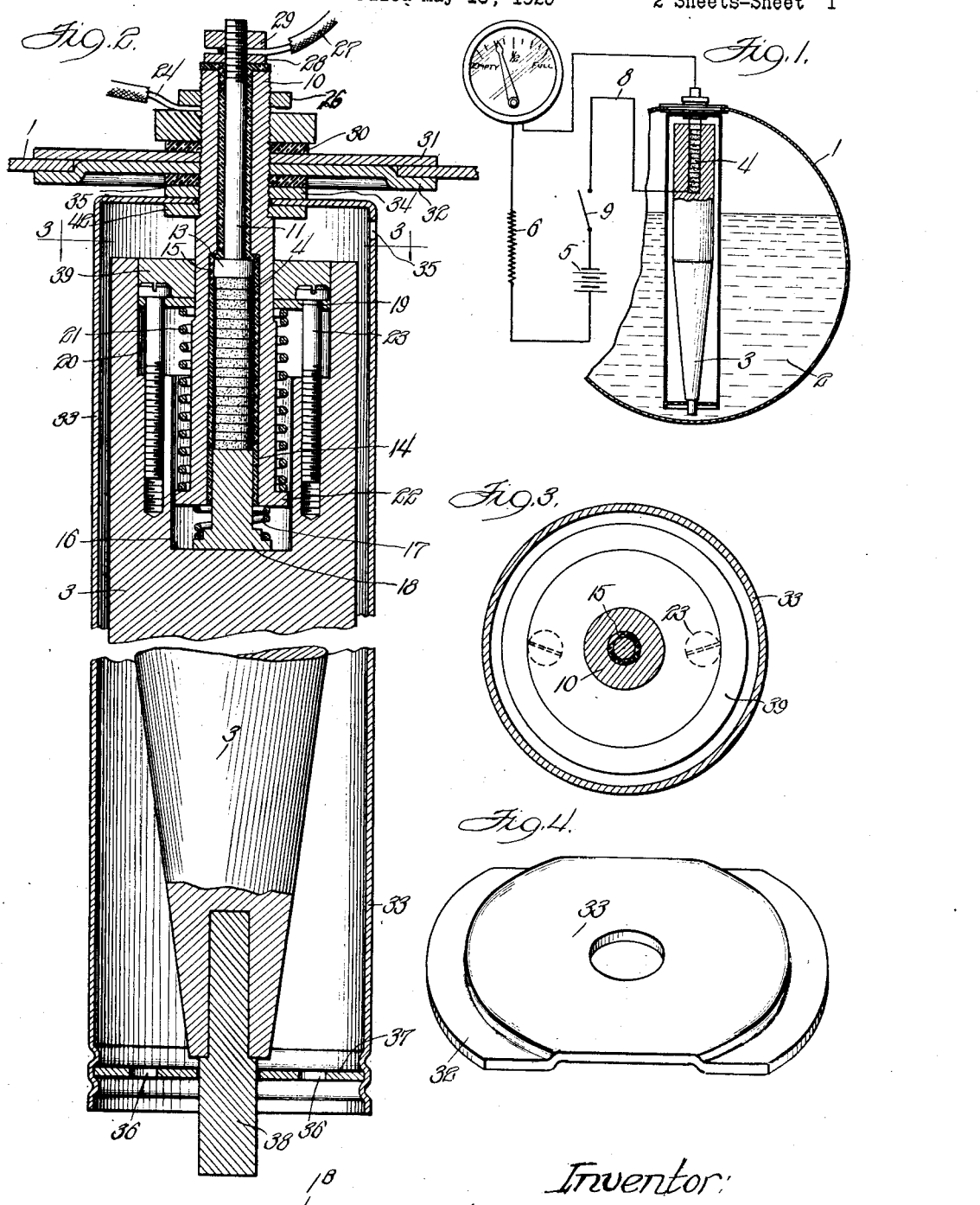

1,717,051

UNITED STATES PATENT OFFICE.

HARRY B. MARSHALL, OF ST. LOUIS, MISSOURI; EDWARD W. TERRY, ADMINISTRATOR OF SAID MARSHALL, DECEASED, ASSIGNOR, BY MESNE ASSIGNMENTS, TO PHOEBE B. MARSHALL, OF CHICAGO, ILLINOIS.

GASOLINE GAUGE.

Application filed May 18, 1925. Serial No. 30,991.

My invention relates to means for indicating the level of a liquid and for permitting the indication to be displayed either intermittently or continuously at a point located at any desired distance from the liquid. More particularly, my invention relates to an electrically operated liquid level indicator, one of its general purposes being that of providing a compressible resistance in circuit with a source of current and an ammeter, and of subjecting this resistance to pressure responsive to the buoying effect of the liquid. Furthermore, my invention aims to provide an appliance for this purpose which can readily be attached to any liquid container, which will not be seriously affected by vibrations of the liquid, which will not permit oscillations of the liquid or the container to open the circuit, which can easily be adjusted, and which can readily be constructed so as to afford readings accurately proportioned to the depth of the liquid in a container of any given shape.

My invention also provides a device of this kind particularly suitable for use in the gasoline tanks of automobiles and easily attachable to such tanks, and one which will not include gearing, rotatable shaft or other friction producing mechanism in the construction of the current controlling device. It likewise provides a device which can readily be employed with low voltage battery currents, either in connection with a separate battery or with the ignition circuit of the automobile, and which can be employed with equal facility for indicating the amount of lubricating oil in the corresponding oil chamber of the automobile. Furthermore, my invention provides a device of this kind which can readily be constructed in varying lengths for the same height of liquid container, so as to have the zero reading of the indicator correspond either to a substantially complete emptying of the container, or to a consumption of the liquid down to a point merely leaving a reserve supply.

Still further and also more detailed objects will appear from the following specifications and from the accompanying drawings, in which Fig. 1 is a diagrammatic view showing an embodiment of my invention as employed in connection with a separate battery circuit and with a liquid tank having the general shape of a cylinder which has its axis horizontal.

Fig. 2 is an enlarged central and vertical section through the current-controlling device and the liquid container of Fig. 1.

Fig. 3 is a horizontal section taken of Fig. 2 along the line 3—3.

Fig. 4 is a perspective view of the inner clamping member used in fastening the current controlling device of Fig. 2 to the top of a tank.

Fig. 5 is a diagram showing desirable circuit connections for the same device when the controlling current is supplied through entirely insulated conductors by the battery of an ignition circuit.

Fig. 6 is a similar diagram showing corresponding connections when a ground return is employed.

Fig. 7 is a central and vertical section through the upper portion of a current controlling device showing another embodiment of my invention.

Fig. 8 is a horizontal section taken through Fig. 7 along the line 7—7.

Fig. 9 is a somewhat diagrammatic view showing a simplified embodiment of my invention as employed in a separate receptacle attached to a liquid container.

In one of its immediate commercial applications, my invention is particularly adapted for use upon automobiles in giving the driver a continuously visible indication of the amount of gasoline in the gasoline tank of his car, or of the amount of lubricating oil which his car is carrying. I am, therefore illustrating my invention in connection with such embodiments, although I do not wish to be limited as to the uses of the same.

Fig. 1 shows a tank 1 containing a liquid 2 and shows a vertical member 3 slidably supported within the tank so that it will be raised against the action of gravity by the buoying effect of the liquid, which effect in turn is proportioned to the height of the liquid of the tank. The buoyed member 3 is hollowed out at its upper end so as to house a carbon pile 4 and to compress this carbon pile against the top of the tank. Consequently, the varying height of the liquid will vary the resistance of the carbon pile and hence will vary the current flowing through a circuit connected to the two ends of the carbon pile. This circuit is here shown as including a battery 5, a fixed resistance 6 and an ammeter 7, it being obvious that the ammeter can be mounted at any distance from the tank by suitably lengthening the conducting portions 8 of the circuit, and also that the circuit as a whole can be controlled by any suitable switch 9. By suitably calibrating the ammeter, I can make its indications correspond to varying levels of the liquid, such as the "full", "half" and "empty" level markings of Fig. 1.

To make the current controlling device readily attachable to an ordinary liquid container, I desirably construct it so that the entire device, including the circuit connections, can all be carried by a stem which is clamped to the top of the container, such as the metal stem 10 of Fig. 2. This metal stem has a longitudinal bore, the lower portion of which houses a carbon pile 4 and also a portion of the lower presser member 12 which directly supports the carbon pile 4. The said bore likewise houses an upper presser head 13 bearing against the top of a carbon pile and carrying a shank 11 which extends through the upper and smaller diametered portion of the bore beyond the upper end of the hollow stem 10. The bore has an insulating lining 15 extending for its entire length, so as to insulate the metal stem 10 from both of the said presser members and from the carbon pile.

In practice, the upper end of the buoyed member 3 is desirably hollowed out so that it houses both the portion of the stem 10 in which the carbon pile is mounted and the lower presser member, which presser member 12 may have its bottom directly engaging the bottom 16 of the said bore in the buoyed member as shown in Fig. 2. Then I interpose a flexible member, such as a quite light spring 17, between the lower end of the stem 10 and the enlarged lower head 18 of the lower presser member, so as to maintain a continuous electrical connection between the lower presser member and the stem 10.

To guide the buoyed member for vertical movement with respect to the stem 10, I provide a disk 19 which slidably fits the upper portion 20 of the bore in the buoyed member. I also interpose a compression spring 21 between this disk 19 and a laterally projecting flange 22 on the stem 10, so that the spring will continuously tend to lift the washer 19. This washer is connected to the buoyed member by a pair of screws 23 extending through the washer 19 and threaded into the buoyed member, so that an adjusting of these screws will compress the spring 21, thereby causing the thrust of this spring to raise the buoyed member with respect to the stem 10. Thus arranged, the spring 21 can counteract the effect of gravity on the buoyed member to any desired extent, thereby permitting the device to be adjusted to a high degree of the sensitiveness and also permitting an adjustment of a minimum compression to which the carbon pile is subjected when in use. After the screws 23 have been adjusted for this purpose, the upper part of the bore 20 can be filled with wax (as shown at 39) so as to seal this bore.

For the circuit connections, I am here showing a wire 24 clamped between a pair of nuts 25 and 26 which are threaded on the stem 10, and a companion wire 27 resting upon a washer 28 which is insulated from the top of the stem 10 and clamped against this washer by a nut 29 threaded on the shank 11 of the upper presser member. The nut 26 also serves as a support for the main portion of the device, being disposed immediately above a rubber washer 30 which rests on a perforated plate 31, which plate bears against the top of the tank 1 and extends across an opening in the latter. Opposed to this perforated plate 31 is a companion plate 32 which is clamped against the top 1 of the tank by the tightening of the nut 26. To effect this clamping I provide the stem 10 with a shoulder supporting a washer 42 which in turn supports the top of a surge-preventing casing 33 and another washer 34 above the latter, there desirably being a rubber washer 35 interposed between the washer 34 and the clamping plate 32.

The casing or shield 33 is here shown as a cylinder closed at both ends except for a relatively small air vent 35 close to its upper end and a pair of ports 36 in the bottom 37 of the hollow cylinder. This bottom 37 is also shown as slidably guiding a guide stem 38 which is fastened to the lower end of the buoyed member 3 in axial alinement with the stem 10 and the carbon pile and which guide stem terminates at some distance above the bottom 40 of the tank.

With the parts thus arranged, liquid poured into the tank will enter the interior of the casing 33 through the inlets 36 and hence will assume a level corresponding to the general level of the liquid in the tank, so that the buoyed member will be subjected to a corresponding lifting effect and hence will exert a proportionate upward pressure on the carbon pile. If the car carrying the tank is severely jolted or bumped, the liquid in the tank may be splashed upward considerably, and these surgings would spoil the accuracy of the readings on the indicating ammeter 7 if no shield or casing were provided around the buoyed member. However, with this casing 33 positioned as described, liquid can only pass through the bottom openings 36 as fast as air can enter or leave through the air vent 35, so that I secure a dampening effect and hence keep the buoyed member subjected to the approximately true level of the liquid regardless of such splashing or surging of the main body of the liquid.

To facilitate the attaching of the device to an ordinary tank, I may employ a lower clamping member 32 having a central raised portion 33 formed to fit into the hole bored in the top of the tank and slightly narrower than the diameter of this hole, so that it can be inserted through the latter. I also desirably provide some means for limiting the downward movement of the buoyed member in the casing 33 during the assembly of the parts, as for example by disposing the lower end of the buoyed member at a relatively short distance above the bottom plate 37 of the surge-preventing casing 33.

While various materials may be employed for the buoyed member 3, the general action will always be the same, since any partially immersed object displaces its own weight of liquid, and I have found ordinary wood turnings satisfactory for this purpose. Such a wooden member may be given a coating of shellac or the like for keeping the liquid from penetrating the same, although the amount of liquid which would thus penetrate an uncoated wooden member would be too trivial in proportion to the total volume of an ordinary tank to have a material effect on the indicator reading. Where a fairly uniform scale is desired on the indicating ammeter, I desirably shape the buoyed member accordingly, the shaping being dependent on the vertical section of the tank. Thus with a tank of a cylindrical vertical section, a downward tapering of the lower portion of the buoyed member after the manner shown in Figs. 1 and 2 can readily be figured out so as to compensate for the curvature of the bottom of the tank.

I am aware that electrically indicating liquid gauges have heretofore been constructed with rheostats controlled stepwise by a switching lever geared or otherwise connected to a float in the liquid. With such arrangements, the indicator hand moves stepwise also and the disposing of a float in the main body of liquid subjects this float to the surging action which is quite marked when the gauge is used on a vehicle. Hence the indicator needle in such gauges vibrates greatly when the vehicle is in use and may seriously mislead the user as to its indications. With my presented construction, the variation in resistance is continuously graded, thus entirely avoiding any jerky movement. So also, the use of my guard casing or shield keeps the level of the liquid adjacent to the buoyed member so nearly constant as to avoid the undesirable vibrating of the indicator hand, thereby making the indicator easily read and highly dependable even when the vehicle on which my gauge is used is traveling over rough roads. So also, I entirely avoid any danger of sparking such as may occur in rheostats having a switch arm moving from contact to contact and hence eliminate the fire risk even when using my gauge in connection with a gasoline tank.

However, while I have heretofore described my gauge in an embodiment having highly desirable features of construction and arrangement, I do not wish to be limited as to these, since many changes might obviously be made without departing either from the spirit of my invention or from the appended claims.

For example, Fig. 7 shows another construction of the current controlling portion of my gauge, namely one in which no surge-dampening shield is employed, such a shield being unnecessary where the liquid container is not subject to tilting or jarring. In this case, the adjustable spring 21 abuts at its top against the head 19B of a hollow guide member which has a cylindrical portion 41 slidably fitting the bore 43 of the buoyed member 3. The lower presser member 14 is freely spaced from the bottom 16 of the bore of the buoyed member, and a thrust member 44 is interposed between this presser member and a metal plug 45 socketed in the buoyed member. With this construction, the thrust member desirably extends for some distances into opposed bores in the said plug and presser member and the thrust member has each end conically pointed, thereby permitting the thrust member to rock slightly in case the buoyed member is not in exact axial alinement with the hollow stem 10 which houses the resistance.

Fig. 9 shows a simplified arrangement of a type suitable for use with the lubricating oil tanks of vehicles or the like. In this case, an auxiliary casing 46 is connected to the oil tank 47 by vertically spaced pipes 48 and 49, such connections being easily made at the usual pet cock openings, thereby permitting oil to present the same level in the auxiliary casing as in the main tank. Floating in the oil within the casing 46 is a wooden block 50 which is hollowed out at its upper end to house a metal cup 51 connected by a flexible strip 52 to one side of the circuit. A lower presser member 53 rests on the bottom of the cup 51 and supports the carbon pile 4, while an upper presser member 54 is interposed between the top of the carbon pile and the top of the casing 46 and electrically connected to the other side of the circuit.

I claim as my invention:—

1. A gauge for liquid within a tank, including a member immersed to a varying extent in the liquid according to the depth of liquid in the tank and continuously buoyed by the liquid, means guiding the buoyed member for vertical movement, a compressible resistance operatively interposed between the buoyed member and the tank so as to be compressed according to the lifting of the said buoyed member by the liquid, and a spring operatively interposed between the bottom of the guide means and the buoyed member for continuously maintaining the resistance under compression.

2. A gauge for indicating the height of liquid in a tank, comprising an upright cylindrical casing supported within the tank and having upper and lower portions communicating with the interior of the tank, the casing being somewhat shorter than the height of the tank, a buoyed member guided within the casing for vertical movement and having circular horizontal sections, a resistance member arranged so as to be compressed by upward movement of the buoyed member, and means for indicating variations in the resistance of the resistance member; the diameter of the buoyed member varying downwardly from the top to the bottom thereof in approximately joint proportion to the drop in voltage through the resistance according to the pressure on the latter and to the relative horizontal sectional areas of the tank at different heights of the latter substantially as described.

3. A gauge for liquid within a tank, including hollow guide member depending within the tank, upper and lower pressure members within the guide member and a compressible resistance between them, the two presser members fitting the guide member to substantially seal the bore of the latter against the entrance of liquid, a buoyed member disposed within the tank and guided by the guide member and extending below the latter, the upper presser member being fixed with respect to the guide member and the lower presser member being vertically slidable in the guide member.

4. A gauge for liquid within a tank, including hollow guide member depending within the tank, upper and lower presser members within the guide member and a compressible resistance between them, the two presser members fitting the guide member to substantially seal the bore of the latter against the entrance of liquid, a buoyed member disposed within the tank and guided by the guide member and extending below the latter, the upper presser member being fixed with respect to the guide member and the lower presser member being vertically slidable in the guide member, and spring means interposed between the buoyed member and the lower presser member for yieldingly supporting the presser member from the guide member.

5. A gauge for liquid within a tank, including a buoyed member, means guiding the buoyed member for vertical movement, a compressible resistance operatively interposed between the buoyed member and the tank so as to be compressed according to the lifting of the buoyed member by the liquid, and a casing housing the buoyed member, the casing having an upper air inlet and a lower liquid inlet, the casing being formed to afford a narrow space between it and major portion of the buoyed member so as to prevent a surging of liquid within the casing.

6. A liquid gauge, comprising a buoyant member, guide means for said buoyant member, a compressible resistance element housed within said guide means, a resilient support interposed between the buoyant member and guide means, a compression member disposed between the buoyant member and resistance element, and means normally urging said compression member away from said resistance element whereby expansion of the latter is permitted.

7. A liquid gauge, comprising a buoyant member having a recess therein, guide means for said buoyant member extending into said recess, a compressible resistance element housed within said guide means, a resilient support interposed between the buoyant member and guide means and disposed within said recess, means carried by said buoyant member and engaging the resistance member to compress the latter when the buoyant member is moved in one direction, and means normally urging the compression member in an opposite direction to permit expansion of the resistance element.

8. A liquid gauge formed to be disposed within a tank, comprising a float having a recess therein, hollow guide means for the float having one end secured to said tank and its opposite end disposed within said recess, a resilient support interposed between the guide means and float and disposed within the latter, a compressible resistance element within said guide means, means carried by said float for compressing said resistance element, and a liquid surge preventing casing formed to be secured to said tank and surrounding said float and guide means, said casing having a perforated bottom to admit liquid thereto for actuating the float and said compressible resistance to indicate the varying depths of liquid in the tank.

9. A liquid gauge formed to be disposed within a tank, comprising a buoyant member, guide means for said buoyant member, a compressible resistance element within said guide means, a resilient support interposed between the buoyant member and guide means, a compression member disposed between the buoyant member and resistance element to support the latter, and resilient means disposed between the guide means and compression member for normally urging said compression member away from the resistance element whereby expansion of the latter is permitted.

10. In a liquid gauge for tanks or the like, compressing a float having a recess formed in its upper end, guide means for the float formed to be secured to said tank and having one end disposed within said recess, a resilient support interposed between the guide means and float, a liquid surge preventing casing for the float formed to be secured to said tank and having a series of openings in its bottom wall, and a guide pin carried by said float and movable through one of said openings.

11. A liquid gauge comprising a buoyant member having a recess therein, hollow guide means having a portion disposed within said recess, an adjustable resilient support interposed between the guide means and buoyant member within said recess, a compressible resistance element within the guide means, a compression member having one end seated upon the bottom wall of the recess and its opposite end engaging and supporting the resistance element, and spring means normally urging said compression member away from said resistance element whereby expansion of the latter is permitted.

Signed at St. Louis, Missouri, May 15, 1925.

HARRY B. MARSHALL.